Jan. 2, 1934.  A. GUDMUNDSEN  1,941,798
WATER COOLER AND METHOD OF COOLING WATER
Filed Sept. 1, 1932  2 Sheets-Sheet 1
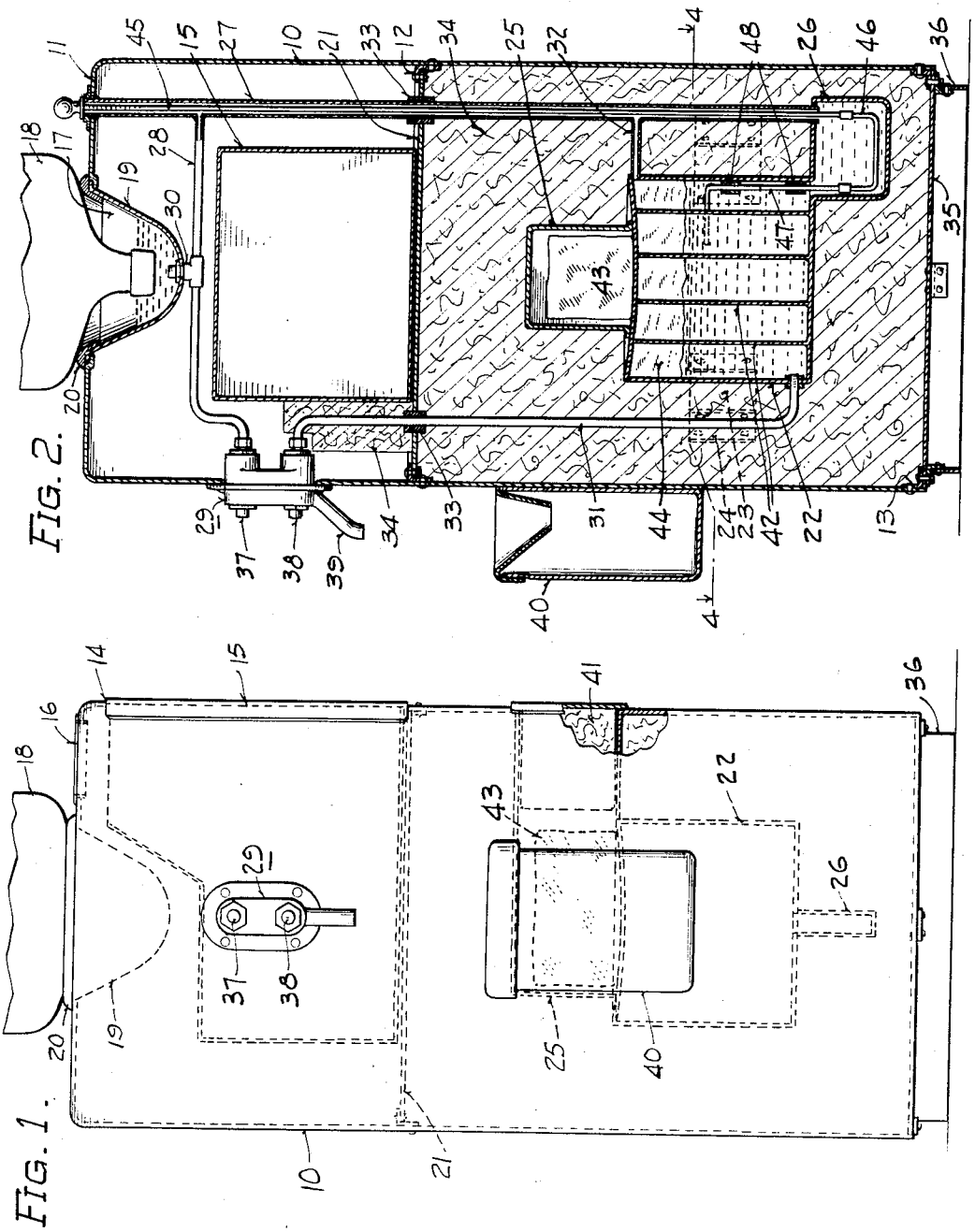
INVENTOR.
Austin Gudmundsen
BY Ezra W Savage
ATTORNEY INVENTOR.
Austin Gudmundsen
BY Ezra W. Savage
ATTORNEY Patented Jan. 2, 1934

1,941,798

UNITED STATES PATENT OFFICE 1,941,798

WATER COOLER AND METHOD OF COOLING WATER

Austin Gudmundsen, Milwaukee, Wis.

Application September 1, 1932. Serial No. 631,323

14 Claims. (Cl. 62—91.5)

The invention relates generally to water coolers and a process of refrigerating water in them.

The object of the invention, generally stated, is to provide a water cooler that is simple and efficient in operation and a process that is inexpensive.

A more specific object of the invention is to provide for utilizing volatile refrigerants which have a high capacity for refrigeration per unit volume to refrigerate drinking water.

A further object of the invention is to provide a water cooler for utilizing volatile refrigerants and in which secondary refrigerants may be formed.

For a fuller understanding of the nature and objects of the invention, reference may be had to the following detailed description taken in conjunction with the accompanying drawings, in which:

Figure 1 is a view in side elevation of a water cooler constructed in accordance with the invention;

Fig. 2 is a view in vertical section showing the structural features of the water cooler;

Figure 3:
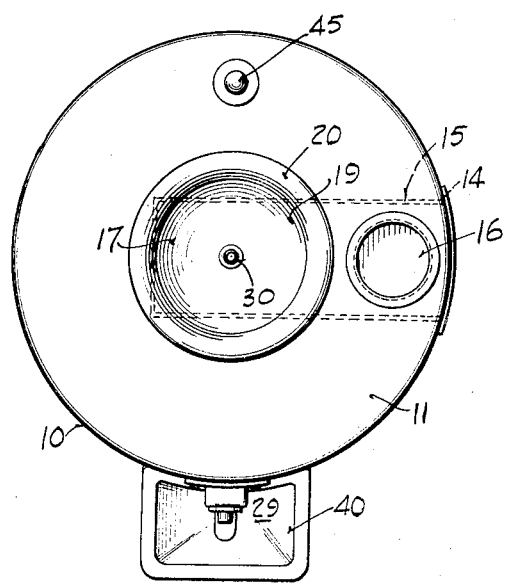
Fig. 3 is a view in top elevation of the water cooler.
Figure 5:
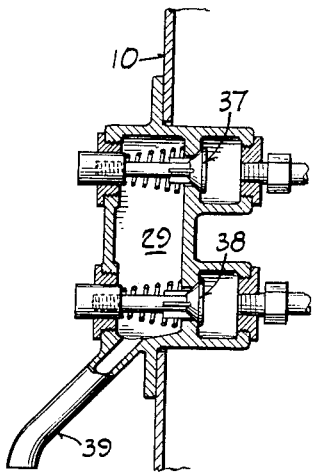
Fig. 5 is a view in section showing details of a water mixer forming part of the water cooler.
Figure 4:
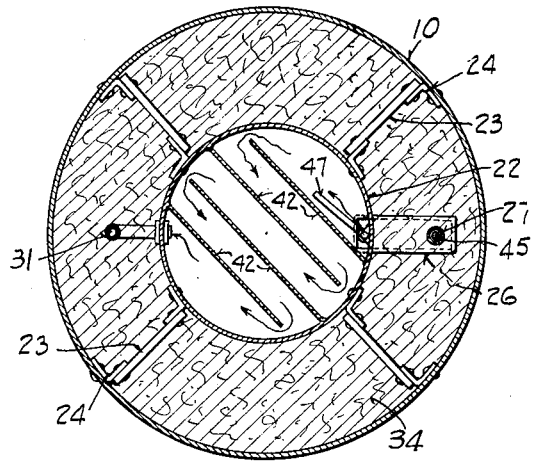
Fig. 4 is a view in horizontal section taken along the line 4—4 of Fig. 2.
Figure 6:
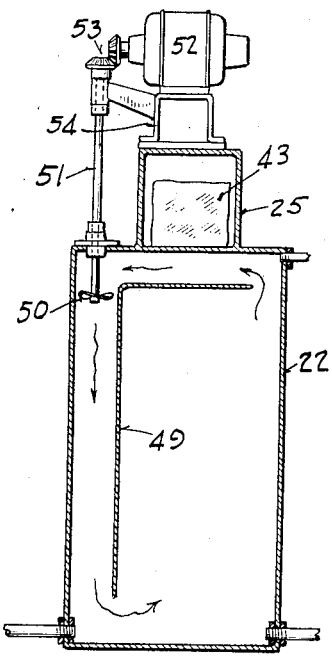
Fig. 6 is a view in vertical section of a modification of the water container.

Referring now to the drawings and Figs. 1 and 2 in particular, the water cooler comprises a cylindrical casing 10 having a top 11 welded thereto in any suitable manner. As illustrated, a ring 12 which in cross-section is the shape of an angle iron is disposed inside of the casing and welded thereto near the central portion. At the bottom of the casing another ring 13, similar in shape to the ring 12, is bolted to the casing. The functions of the rings 12 and 13 will be explained in more detail hereinafter.

The casing 10 has a large opening 14 in the side near the top for receiving a cup receptacle 15 which, in this instance, is made to simulate a drawer. Directly above the receptacle 15 there is an opening 16 in the top of the casing through which used water cups may be dropped.

A large opening 17 is provided centrally of the top of the casing for receiving the neck of a water bottle 18. Depending through the opening 17 and seated on a flange formed around the opening is a dish-shaped member 19. As illustrated, the neck of the bottle 18 projects downwardly into the dish-shaped member 19. A gasket 20 is mounted on the upper edge of the member 19 and serves as a seat for the bottle 18.

A partition 21 which extends transversely of the casing 10 is mounted on the ring 12, referred to hereinbefore. This partition is located immediately below the cup receptacle 15. In order to facilitate the assembling of the container, the partition is removably attached to the ring in some suitable manner as by means of bolts.

As best shown in Fig. 2, openings are provided in the partition 21 for water pipes of the water circulating system, which will be described in more detail hereinafter. The water container or tank 22 is disposed in the lower portion of the casing and supported on transite boards 23 or other suitable material carried by lugs 24 welded to the casing. The transite boards are interposed between the casing and water container in order to insulate one from the other to prevent a transfer of heat.

The water container 22 may be made from any material such as stainless steel which will not rust or corrode in the presence of water. Further, since the casing is cylindrical, it is preferable to make the water container cylindrical.

A refrigerant container 25 is mounted on top of the water container 22. The size of the container 25 will depend upon the size of the water container 22 and the refrigerant to be utilized.

The top of the water container 22 is shaped to simulate a section cut from a hollow sphere in order to prevent air from collecting directly beneath the refrigerant container 25. It will be readily appreciated that if air was allowed to collect between the water and the top of the water container, it would act as an insulator and prevent the efficient transfer of heat from one container to the other.

The bottom of the container 25 is shaped to conform with the curvature of the top of the water container to facilitate the assembling operations. Further, an opening will be provided in one side of the container 25 for receiving the refrigerant.

A small rectangular container 26 depends from the water container 22, as best shown in Fig. 2. The container 26 will also be made from stainless steel or some other non-corrosive material and communicates with the water container 22.

The water circulating system comprises a vertical pipe 27 which communicates with the container 26 and extends through the top 11 of the casing 10. A horizontal pipe 28 extends from the vertical pipe 27 to a mixing chamber shown generally at 29. A connection 30 is provided for feeding water from the member 19 to the pipe 28. Another vertical pipe 31 connects the water container 22 to the mixing chamber 29.

In order to provide for the escape of trapped air from the water container 22, a connection 32 is provided between the water container 22 and the vertical pipe 27. As shown, the connection with the water chamber is as near the top as possible.

When assembling, rubber gaskets 33 are mounted in the openings in the partition 21 for receiving the pipes 27 and 31. These gaskets insulate the pipes from the partition.

After the water circulating system and containers have been assembled in the casing, some suitable heat insulating material 34 is packed around them. Many suitable heat insulating materials are available and may be used with equal success. Kapok has been found very satisfactory for this purpose.

In order to provide for periodically introducing the charge of refrigerant into the cooler, an opening through the insulation is provided in alignment with the opening in the container 25. This opening may be closed by a plug 41 which is also made from insulating material. The outer end of the plug is designed to harmonize with the cup receptacle 15. The shape of the opening and plug will preferably be rectangular to accommodate blocks of some suitable refrigerant.

The lower end of the cylindrical casing 10 is closed by a bottom 35 which is removably attached to the ring 13. A supporting base 36 depends from the bottom 35.

The mixing chamber, shown generally at 29, is provided with two push button valves 37 and 38 for controlling the flow of water directly from the source of supply 18 and the container 22, respectively. Leading from the bottom of the mixing chamber is a spout 39.

A drain basin 40 is disposed on the side of the casing 10 to catch any overflow of water from the spout 39. This basin will be carefully designed and ornamented to harmonize with the casing generally.

In order to circulate the water in the container 22 as it passes therethrough to obtain a mixture of the proper temperature, vertical baffles 42 are provided therein. These baffles may be welded to the side of the container and their spacing will depend on the conditions to be met. In this instance four baffles are shown.

In fabricating and mounting the containers and making the various connections, the skill of the welder may be resorted to and it has not been attempted to point out the exact manner of fabricating and assembling since this may be changed from time to time without departing from the inventive features.

Investigation has revealed that in a cooler of this kind six pounds of dry ice, which is solid carbon dioxide, will cool water from 80° F. to 55° F. and take care of normal heat loss for six days. In order to accommodate a block of dry ice this size, it is necessary to provide a dry ice chamber 4½ inches in section by 10 inches long. With a refrigerant container of this size, the water container or tank should be about 11 inches in diameter and 9 inches deep. Containers of this size will permit the making of a small, good appearing, cooler for refrigerating water delivered in standard five-gallon bottles.

Assuming now that a bottle of water is placed in the cooler filling the container or tank 22, and that a block 43 of dry ice has been introduced into the refrigerant container 25; then the dry ice will begin to dissipate and absorb heat from the water in the tank 22. Since there is only a thin metal wall between the refrigerant and the water, the transfer of heat will be efficient and the water will be quickly cooled. When the dry ice is in the proportion of six pounds to enough water to fill a container 11 inches in diameter and 9 inches deep, a portion of the water will be frozen, forming a secondary refrigerant.

The dry ice which is volatile but has great capacity for lowering the temperature of the water to be refrigerated, will dissipate in from one to three hours but it reduces the temperature of the water and forms enough ice to carry on the refrigerating operation for several days.

In the forming of the ice shown at 44, the water freezes from the top downwardly. The process is slow and the crystals progress downwardly and do not cause any damage to the tank.

In order to measure the amount of ice in the water tank 22, a measuring device is provided, as illustrated, and comprises a graduated rod 45 slidably mounted in the pipe 27. As shown, a U-shaped member 46, which is carried by the rod 45, supports a vertical rod 47 which extends upwardly from the container 26 into the tank 22. The vertical rod is retained in position by means of bearings 48 welded to the inner wall of the tank 22. The rod 45 may be graduated in any well known manner to indicate the amount of ice in the top of the tank 22. In this manner it is easy to determine when the next charge of refrigerant is required.

Since the temperature of the water is reduced to freezing, it is not suitable for all users. Therefore in coolers of this type which lower the temperature of the water to approximately 32° F., a mixing chamber is provided. If it is desired to draw water from the tank 22, the valve 38 is operated. When it is desired to draw water having a temperature well above that in the tank 22, both valves 37 and 38 may be operated effecting a mixture of water from the tank 22 and the source of supply, the water bottle 18.

In some instances as in soda fountains and the like where large quantities of water are drawn in a short period, larger tanks 22 may be provided. In such coolers, the water would not be cooled evenly throughout and provision is made for setting up currents so as to effect a mixing of the water and the equalizing of the temperature throughout. In order to circulate the water, a baffle 49 is mounted in the container. As shown, the baffle is angular in section and disposed with the vertical arm extending parallel to the wall of the tank. An impeller 50 is suspended in the tank between the baffle and the wall by means of a vertical shaft 51.

An electric motor 52 of any suitable type is provided for driving the shaft and impeller. Any suitable drive may be interposed between the motor and the shaft and, in this instance, bevel gears 53 are provided. Bearings for the vertical shaft 51 are disposed in the top of the tank 22 and bracket 54 provided for supporting the motor.

In the refrigerating operation the impeller is operated forcing the water downwardly between the baffle and tank wall and drawing water from the main body across the underside of the top of the tank 22 which is the partition between the dry ice chamber and the water tank.

Since certain changes may be made in the above invention and different embodiments of the invention made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, may be said to fall therebetween.

Having described my invention, what I claim as new and desire to secure by Letters Patent is:

1. The method of refrigerating water in a cooler which comprises intermittently subjecting the water to be drawn off to the cooling influence of a refrigerant which has capacity to freeze a part of the water to convert it into a secondary refrigerant for the remainder of the water, the freezing of the water being effected from the top to cause the freezing process to progress downwardly.

2. The method of refrigerating water in a cooler which comprises intermittently subjecting the water to be drawn off to the cooling influence of a volatile refrigerant of great refrigerating capacity to freeze a part of the water in a short time, to convert it into a secondary refrigerant which has capacity for longer duration, thereby to prolong the refrigerating process.

3. A water cooler comprising a container for the water to be cooled, means for delivering water to and discharging it from the container, a container for a refrigerant carried by the water container, the top of the water container supporting the refrigerant container being curved downwardly to effect the movement of air that may collect to the edges of the container whereby the whole contacting surfaces of the containers is effective for the transfer of heat.

4. In a water cooler, in combination, a container for water to be refrigerated, a container for a refrigerant associated with the water container to provide for a transfer of heat from one to the other, and means extending into the water container for measuring the amount of ice therein.

5. A water cooler comprising, in combination, an insulated container for the water to be refrigerated, pipes extending from the source of supply to the water container, and a measuring member movably mounted in one of the pipes and extending into the water contained for measuring the amount of ice therein.

6. A water cooler comprising, in combination, a casing, a water container disposed in the casing, a container for a refrigerant mounted in contact with the water container so that efficient transfer of heat may take place between them, means for insulating the containers for water and the refrigerant from the casing, a graduated measuring member extending into the water container for measuring the amount of ice therein, and a casing for the measuring member communicating with the water container and extending to a point to hold a column of water sufficient to balance the water pressure in the water container.

7. A water cooler comprising, in combination, a casing, a water container disposed in the casing near the bottom thereof, a container for a refrigerant mounted in close association with the water container to provide for efficient heat transfer between them, insulation packed around the containers and filling the lower portion of the casing, a cup receptacle disposed in the casing above the container, said casing having an opening in the top to permit the dropping of cups into the receptacle, means extending from the upper part of the casing to the water container, and means for measuring the amount of ice in the water container mounted in the water conveying means for conveying water to and discharging it from said container.

8. A water cooler comprising a container for the water to be refrigerated, means for supplying water to and discharging it from the container, a container for a refrigerant mounted on the water container in close association therewith to provide for efficient heat transfer between the containers, the upper wall of the water container being curved downwardly to cause air that may be collected in the water container to flow to the edges thereof, insulation packed in the lower portion of the casing around the containers, a removable plug of insulating material extending through the insulation about the refrigerant container to permit access thereto, and a cup receptacle removably disposed in the upper part of the casing for receiving used cups, said casing having an opening therein through which cups may be dropped into the receptacle.

9. A water cooler comprising a tank for water to be cooled, means for delivering water to and discharging it from the tank, a container for a refrigerant carried by the water tank, the surface of the water tank supporting the refrigerant container being curved downwardly to effect the movement of air that may collect to the edges of the water tank to cause the whole contacting surface of the container and tank to function efficiently in the transfer of heat, and an outlet from the upper edge of the water tank for permitting the escape of air.

10. The method of carrying on a continuous refrigeration of water which comprises intermittently subjecting the water to be cooled and drawn off to a refrigerant with sufficient capacity to freeze a part of the water to produce ice, and then utilizing the ice as a secondary refrigerant to continue the refrigerating process when the intermittently supplied refrigerant has been dissipated.

11. The method of refrigerating water in a cooler which comprises subjecting the water to be drawn off to the cooling influence of a solid refrigerant of great capacity to freeze part of the water to produce ice, and then utilizing the ice as a secondary refrigerant to continue the refrigerating process after the first refrigerant has been dissipated.

12. The method of refrigerating water in a cooler which comprises supplying water to a refrigerating chamber as quickly as it is drawn off, intermittently subjecting the water in the refrigerating chamber to the cooling influence of a refrigerant of great capacity to freeze part of the water to be drawn off to produce ice, and then utilizing the ice as a secondary refrigerant to continue the refrigerating process after the first refrigerant has been dissipated.

13. In a water cooler, in combination, a container for a refrigerant, a container for water to be cooled and drawn off, means for circulating the water to and from the water container, a substantially U-shaped ice measuring member disposed in the water circulating means, and an auxiliary container disposed adjacent the water container at the junction with the circulating means to permit a longitudinal movement of the measuring member to perform measuring operations.

14. In a water cooler, in combination, a container for the water to be cooled, means for supplying water to and discharging it from the container, a container for a refrigerant associated with the water container, the wall between the water container and the refrigerant container being shaped to conform to a section of a sphere which extends downwardly into the water container to prevent the collection of air between the containers, thereby maintaining good heat transfer, and baffles provided in the water container to effect a mixing of the water as it passes through the container to improve the refrigerating operation.

AUSTIN GUDMUNDSEN.